(12) United States Patent
Tourrilhes et al.

(10) Patent No.: US 6,975,857 B2
(45) Date of Patent: Dec. 13, 2005

(54) AUTOMATICALLY CONFIGURING A COMMUNICATION INTERFACE OF A DEVICE FOR CONNECTION WITH A WIRELESS COMMUNICATION NETWORK

(75) Inventors: Jean Tourrilhes, Mountain View, CA (US); Venkatesh Krishnan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 630 days.

(21) Appl. No.: 09/891,705

(22) Filed: Jun. 26, 2001

(65) Prior Publication Data

US 2002/0197985 A1 Dec. 26, 2002

(51) Int. Cl.⁷ ................................................ H04M 3/00
(52) U.S. Cl. ........................ 455/420; 455/418; 455/414
(58) Field of Search ................................ 455/418, 419, 455/420, 550.1, 552.1, 556.1, 556.2, 557, 466, 403, 411, 73

(56) References Cited

U.S. PATENT DOCUMENTS

| | | | | | |
|---|---|---|---|---|---|
| 5,537,474 | A | * | 7/1996 | Brown et al. ................ | 380/248 |
| 5,835,861 | A | * | 11/1998 | Whiteside .................... | 455/466 |
| 6,167,280 | A | * | 12/2000 | Barrett et al. ................ | 455/466 |
| 6,405,027 | B1 | * | 6/2002 | Bell ............................. | 455/403 |
| 6,560,443 | B1 | * | 5/2003 | Vaisanen et al. .............. | 455/73 |
| 6,584,175 | B1 | * | 6/2003 | Kibria et al. ................ | 379/1.03 |
| 6,622,018 | B1 | * | 9/2003 | Erekson ....................... | 455/420 |
| 6,721,555 | B1 | * | 4/2004 | Phillips et al. ............... | 455/411 |

* cited by examiner

Primary Examiner—Cong Van Tran (57) ABSTRACT

A system for automatically configuring a first communication interface of a device for connection with an external wireless network includes a communication parameter source external to the device to store communication parameters of the wireless network. A second communication interface is placed inside the device to communicate with the communication parameter source for the communication parameters. An interface configuration module is coupled to the first and second communication interfaces. The interface configuration module causes the second communication interface to receive the communication parameters, and then configures the first communication interface using the communication parameters such that the device can be connected to the wireless network. A method of automatically configuring a communication interface of a device for connection with an external wireless network is also described.

16 Claims, 4 Drawing Sheets

AUTOMATICALLY CONFIGURING A COMMUNICATION INTERFACE OF A DEVICE FOR CONNECTION WITH A WIRELESS COMMUNICATION NETWORK

BACKGROUND OF THE INVENTION

1. Field of the Invention

The present invention pertains to wireless network communication. More particularly, this invention relates to automatically configuring a communication interface of a device for connection with a wireless communication network.

2. Description of the Related Art

Different wireless networks offer different characteristics. Local wireless communication links can be used to reach locally connected devices and/or systems. Wireless communication links can also be used to reach local infrastructures. A device with more than one wireless link can exploit this diversity by selecting the current best link for the specific network transaction it needs to perform.

However, as is known, the wireless communication networks function differently from the wired communication network when it comes to connecting a new device and/or system to the wireless network. For example, in a wireless network system such as the system 10 shown in FIG. 1, when a new wireless system (e.g., the wireless system 11) is added to the existing wireless network (e.g., the network 12), the new wireless system 11 must also contain the same wireless communication parameters as that of the network 12. Here, network 12 includes a number of wireless systems that can communicate with each other wirelessly.

Figure 1:
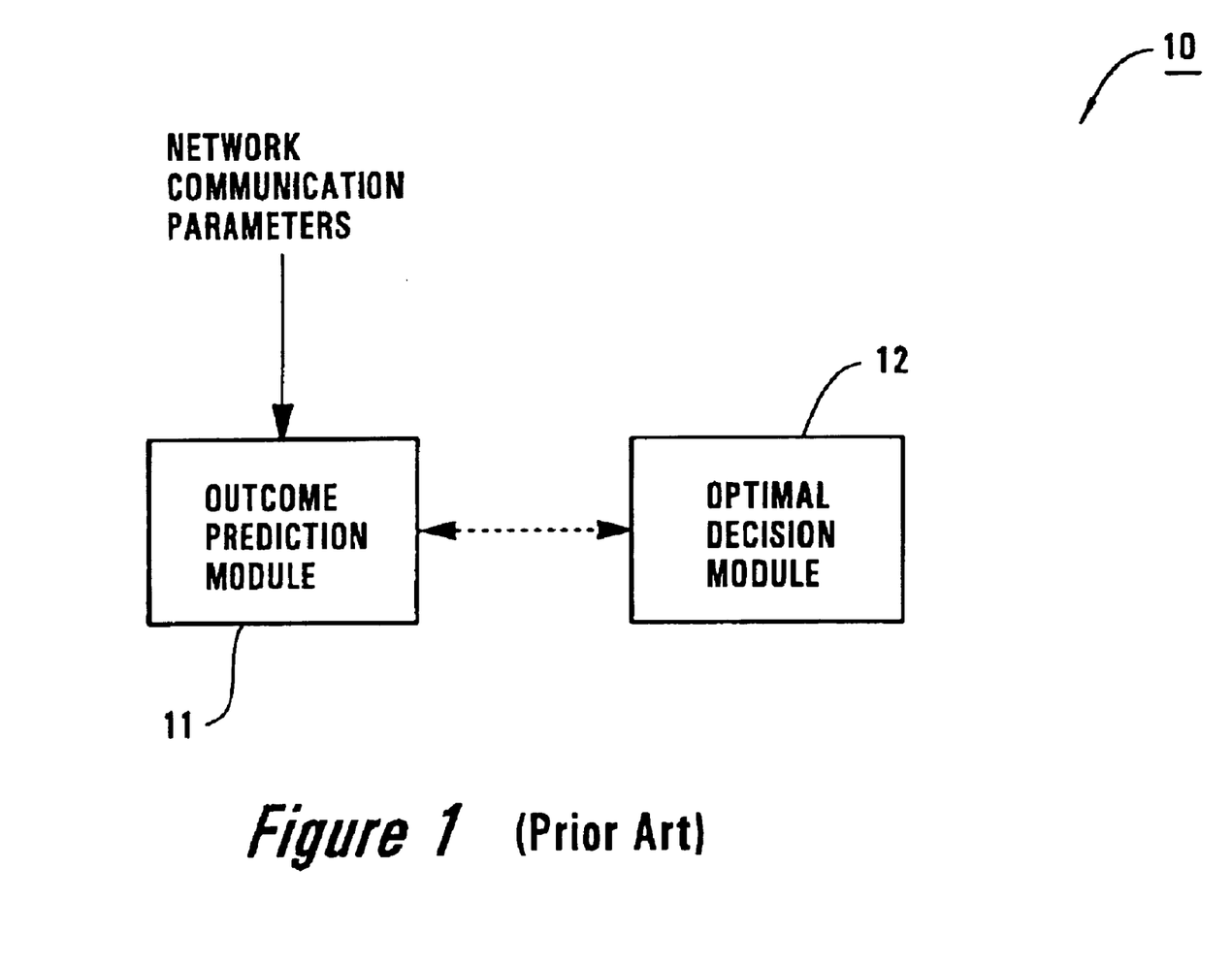
FIG. 1 shows a wireless communication network system in accordance with prior art.

In this situation, one prior art way for the new device 11 to establish wireless communication with the wireless network 12 is to pre-configure the communication interface of the device 11 with the communication parameters of the network 12. This means that the new device 11 must be configured before establishing communication with the network 12. The communication parameters typically include the network ID parameter, the frequency of communication parameter, the time synchronization parameter, the ID address of the device parameter, the encryption key parameter, and the proxy of the device parameter. The communication parameters may include other parameters.

One disadvantage of the above mentioned prior art approach is that the network 12 is not user transparent. This means that the user of a device must know the communication parameters of the network in order to connect his/her device to the network. If the parameters are not available, the user cannot connect his/her device to the network. A person new to an existing wireless network typically does not know the communication parameters of the network, and typically cannot connect his/her devices to the network.

Another disadvantage is the manual configuration of the communication interface of the new device with the communication parameters of the network. This is especially so when a device is changed from one wireless network to another. The communication parameters of the new network must be entered into the device and manually.

Another prior art approach is to make the discovery using the very same communication interface to be configured. The problem of this approach is that it may discover too many networks. In addition, the discovery process may be unbearably slow. The discovery process may also be not secure as well.

SUMMARY OF THE INVENTION

One feature of the present invention is to provide a mechanism that allows transparent usage of a wireless communication link.

Another feature of the present invention is to improve user experience in a mobile computing environment.

A further feature of the present invention is to allow automatic configuration of the communication interface of a device such that the device can be connected to the network without any user intervention.

A system for automatically configuring a first communication interface of a device for connection with an external wireless network is described. The system includes a communication parameter source external to the device to store communication parameters of the wireless network. A second communication interface is placed inside the device to communicate with the communication parameter source for the communication parameters. An interface configuration module is coupled to the communication interfaces. The interface configuration module causes the second communication interface to receive the communication parameters, and then configures the first communication interface using the communication parameters such that the device can be connected to the wireless network.

A method of automatically configuring a communication interface of a device for connection with an external wireless network is also described. The method includes a step of providing a second communication interface inside the device. The second communication interface is then caused to communicate with an external communication parameter source for the communication parameters. Then the first communication interface is configured with the communication parameters received such that the device can be automatically connected to the wireless network.

Other features and advantages of the invention will become apparent from the following detailed description, taken in conjunction with the accompanying drawings, illustrating by way of example the principles of the invention.

DETAILED DESCRIPTION OF THE INVENTION

Figure 2:
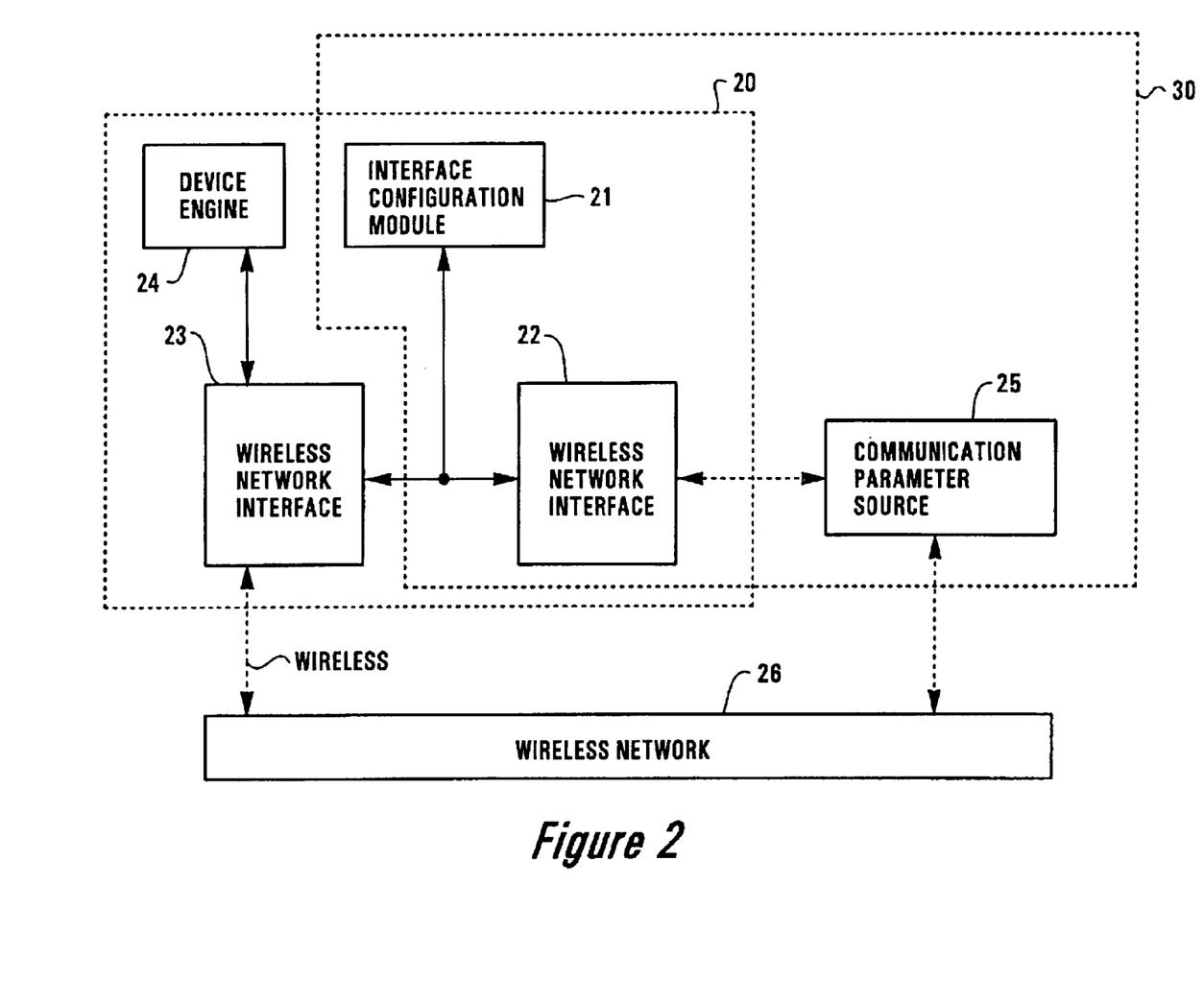
FIG. 2 schematically shows a configuration system that automatically configures a communication interface of a device for connecting the device to an external wireless network in accordance with one embodiment of the present invention.

FIG. 2 shows a configuration system 30 that implements one embodiment of the present invention. As will be described in more detail below, the configuration system 30 allows transparent usage of a wireless communication link. It improves user experience in a mobile computing environment. In particular, the configuration system 30 allows for automatic configuration of a communication interface (e.g., the interface 23) of a device (e.g., the device 20) such that the device can automatically establish wireless communication with an external wireless network (e.g., the network 26) without any user intervention.

The configuration system 30 does the above by using a second wireless network interface (e.g., the interface 22)

within the device 20 to obtain, from an external source (e.g., the communication parameter source 25), the communication parameters and then causes the first interface 23 to be configured with the communication parameters. In doing so, the user of the device 20 does not need to configure the network interface 23 manually. The user also does not need to know the new communication parameters before allowing the device 20 to establish the wireless communication with the communication parameters.

The main advantage of the configuration system 30 is that it provides user transparent access to wireless communication links or networks. The user does not need to configure the communication interface within the device manually. Secondly, the configuration system 30 allows dynamic use of the wireless communication interface. This means that the communication interface is reconfigured automatically based on the environment. The configuration system 30 will be described in more detail below, also in conjunction with FIGS. 2–4.

In FIG. 2, the device 20 can be any kind of portable or mobile electronic device. In one embodiment, the device 20 is a pager or a watch. In another embodiment, the device 20 is a cellular phone or satellite phone. In a further embodiment, the device 20 is a palm-top computer, a personal digital assistant, a personal organizer (e.g., the Jornada personal organizer available from Hewlett-Packard Company of Palo Alto, Calif.), or a mobile computer. In a still further embodiment, the device 20 can be a computer system. Alternatively, the device 20 can be any kind of information appliance, mobile computer system, or any kind of small portable handheld electronic device or appliance.

The device includes a device engine 24 and a wireless network interface 23. The device engine 24 is used to perform the main function of the device 20. Thus, the structure of the device engine 24 depends on the type of the device 20. For example, if the device 20 is a printer, then the device engine 24 is a printer system. If the device 20 is a computer, then the device engine 24 is a computer system. If the device 20 is an information appliance (e.g., Internet radio), then the device engine 24 implements that function.

When properly configured, the wireless network interface 23 allows the device 20 to communicate with the external wireless network 26. The wireless network interface 23 can be any known wireless network interface and can be implemented using known technology. The wireless network 26 collectively represents a number of devices or systems wirelessly connected together for communication with each other. This means that each device/system within the network 26 contains the same communication parameters in order to communicate with each other within the network 26. The establishment of communication of the device 20 with the network 26 means having the device 20 communicate with any one of the devices/systems within the network 26.

In one embodiment, the network 26 is a radio frequency communication network. In this case, the frequency can be a long range radio frequency or short range radio frequency. In another embodiment, the network 26 is a laser communication network. In a further embodiment, the network 26 is an Infra-red communication network. Alternatively, the network 26 may contain only one single wireless communication device.

The communication protocol used for the wireless communication within the network 26 and between the network 26 and the device 20 can be any known communication protocol, and only depends on the communication means employed. For example, if the network 26 employs the Infra-red communication technology for the wireless communication, then the communication protocol can be an IrDA (Infrared Data Association) protocol or TCP/IP protocol.

The configuration system 30 is used to automatically configure the wireless network interface 23 such that the device 20 can communicate with the external wireless network 26 without manual configuration of the interface 23. This means that the configuration system 30 automatically finds and retrieves the communication parameters of the network 26 for configuring the interface 23, and then uses the retrieved communication parameters to configure the interface 23 so that the interface 23 can communicate with the network 26 without any user intervention. The configuration system 30 includes modules inside the device 20. The configuration system 30 also includes modules or systems outside the device 20.

As can be seen from FIG. 2, the configuration system 30 includes an interface configuration module 21, a wireless network interface 22, and a communication parameter source 25. The interface configuration module 21 and the wireless network interface 22 are placed or located inside the device 20. The communication parameter source 25 is located outside the device 20.

The structure of the interface 22 is substantially the same as that of the interface 23 in that both contain the physical layer, the link layer, the network layer, and the transport layer. But the characteristics of the wireless network interface 22 must be different from that of the wireless network interface 23. This means that the wireless network interface 22 may have shorter latency for discovering new devices and establishing communication with the newly discovered device, or a narrower discovery range. It also may make the discovery process more secure. One possible pair of communication means for the two interfaces 22–23 can be (1) radio frequency for the wireless network interface 23 and (2) Infrared for the interface 22. Another pair can be that the interface 23 is a long or medium range radio frequency wireless communication interface while the interface 22 is a short range radio frequency wireless communication interface. A third possible pair can be laser for the interface 23 while infra-red for the interface 22.

The communication parameter source 25 is external to the device 20. The communication parameter source 25 may or may not communicate wirelessly with the network 26. In one embodiment, the communication parameter source 25 communicates wirelessly with one ports within the network 26. In another embodiment, the communication parameter source 25 communicates with one ports within the network 26 through wired communication channels. For example, the communication parameter source 25 may be part of an existing device of the network 26. Alternatively, the communication parameter source 25 does not communicate with the network 26.

The source 25 can be implemented by any known technology. For example, the source 25 can be a content server that stores communication parameters of one communication network or more communication networks. As a further example, the communication parameter source 25 can be implemented as a beacon that passively and periodically broadcasts the communication parameters (or broadcasting according different schemes).

The communication parameter source 25 stores the communication parameters of the network 26. The communication parameters may include the network ID, time synchronization, the encryption key (if secured communication is desired), the frequency of communication, IP (Internet Protocol) address of the device 20, and the proxy server, if any, for the device 20. In addition, the communication parameters may include other parameters, some of which are link or network-specific parameters. Below is an example of a communication parameter file:

wvlan0 IEEE 802.11-DS ESSID: "Hewlett-Packard" Nickname: "jean"

Frequency: 2.412 GHz Sensitivity: 1/3 Mode: Managed

Access Point: 00:60:1D:F0:3A:42

Bit Rate: 11 Mb/s RTS thr:off Fragment thr:off

Encryption key: 5736-6C0E-4365-C35D-4F1F-4BD9-0E70

Power Management Period: 20 ms.

Figure 4:
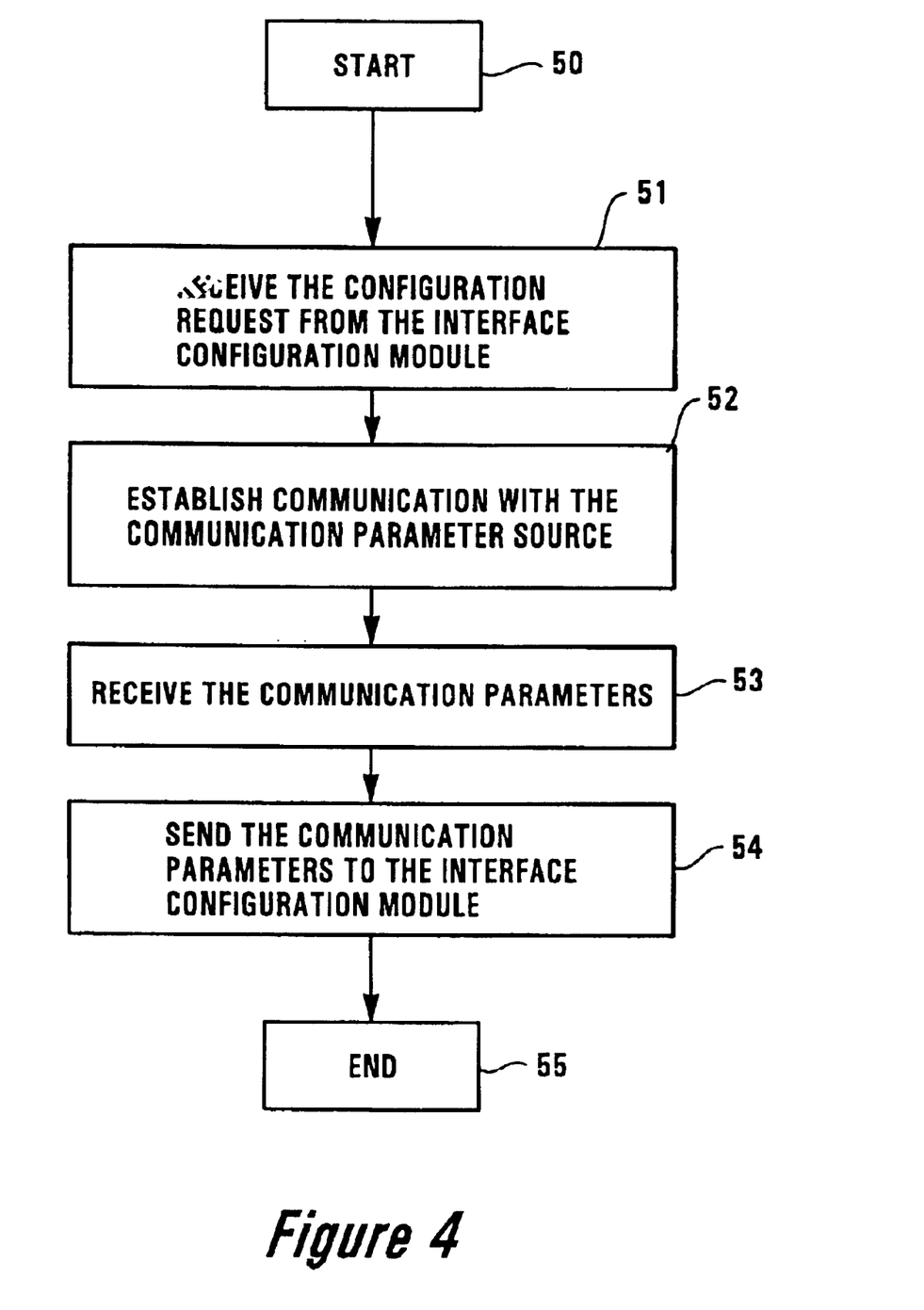
FIG. 4 shows in flow chart diagram form the process of the wireless network interface of the configuration system of FIG. 2.

The interface 22 is used to receive the communication parameters from the source 25. The communication between the two can be secured communication or non-secure. The process of the interface 22 to receive the communication parameters is shown in FIG. 4, which will be described in more detail below.

In one embodiment, the communication between the source 25 and the interface 22 is a secured communication. In another embodiment, the communication between the source and the interface 22 is non-secure.

The interface configuration module 21 controls the automatic configuration operation. The interface configuration module 21 can be implemented using any known technology. FIG. 4 shows in more detail the operation of the interface configuration module 21, which will be described in more detail below, also in conjunction with FIG. 4.

Referring back to FIG. 2, the operation of the configuration system 30 in accordance with one embodiment of the present invention is now described. During operation, the interface configuration module 21 determines that communication parameters of the network 26 are needed for the device 20 and orders the interface 22 to obtain the parameters. The interface 22 then establishes communication with the source 25 to obtain the parameters. The parameters are then sent from the source 25 to the interface 22 (either in a secured communication or non-secured communication).

Alternatively, the source 25 regularly broadcasts the parameters and when the interface 22 is in the broadcast range of the source 25, the parameters are received by the interface 22.

The interface 22 then sends the received parameters to the interface configuration module 21, which then configures the interface 23 such that the device can communicate with the network 26.

Figure 3:
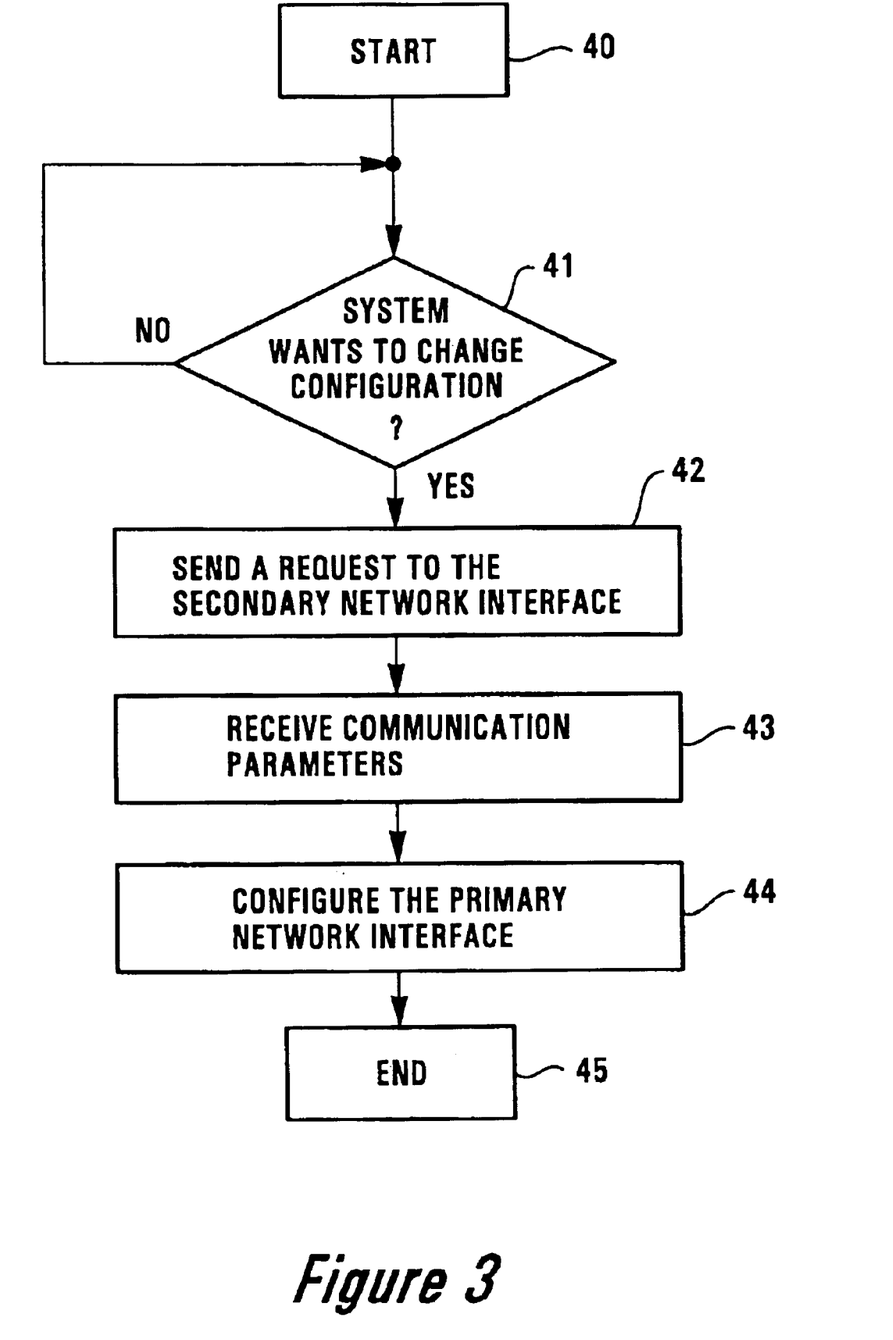
FIG. 3 shows in flow chart diagram form the process of the interface configuration module of the configuration system of FIG. 2.

Referring to FIG. 3, the process of the interface configuration module 21 of FIG. 2 starts at the step 40. At the step 41, the interface configuration module 21 determines whether the host device (i.e., the device 20 of FIG. 2) needs to change the communication configuration of the primary wireless network interface (i.e., the interface 23 of FIG. 2). There are a number of ways to achieve this. One way is to have the device engine 24 of the device 20 periodically and automatically generate the indication signal. Another way is when the device 20 receives a user command to configure the interface 23 (or a notification that the parameters have changed). A further way is when the device 20 detection parameter changes (e.g., when connection fails or is lost).

If, at the step 41, it is determined that the device 20 (FIG. 2) needs to change configuration of the communication parameters of the interface 23 (FIG. 2), then the step 42 is performed, at which the interface configuration module 21 sends a request to the secondary network interface (i.e., the interface 22 of FIG. 2) to obtain the communication parameters. In an alternative embodiment, the interface configuration module 21 does not generate the request and the interface 22 passively receives new communication parameters. In this case, the steps 41 and 42 are not skipped.

At the step 43, the interface configuration module 21 receives the communication parameters. At the step 44, the interface configuration module 21 causes the primary interface (i.e., the interface 23 of FIG. 2) to be configured with the new communication parameters. The process then ends at the step 45.

Referring to FIG. 4, the process of the secondary wireless network interface 22 of FIG. 2 in obtaining the new communication parameters is shown. The process starts at the step 50. At the step 51, the interface 22 receives the request from the interface configuration module 21. At the step 52, the interface 22 establishes the communication with the external communication parameter source (i.e., the source 25 of FIG. 2). In one embodiment, the interface 22 achieves this by broadcasting the request. In another embodiment, the interface 22 discovers the communication parameter source 25 and then connects to it. The discovery process can be done in known manner. For example, the IrDA protocol allows automatic discovery of new communication port in range. This means that if the interface 22 employs the IrDA infra-red (or Bluetooth short range radio) communication, the protocol will allow the interface 22 to automatically detect the source 25 if the source 25 is in the communication range with the interface 22.

At the step 53, the new communication parameters are sent from the source 25 to the interface 22. At the step 54, the interface 22 sends the communication parameters to the interface configuration module 21 for configuration of the interface 23. The process then ends at the step 55.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for automatically configuring a first communication interface of a device for connection with an external wireless network, comprising:

a communication parameter source external to the device to store communication parameters of the wireless network;

a second communication interface inside the device to communicate with the communication parameter source for the communication parameters;

an interface configuration module coupled to the first and second communication interfaces, wherein the interface configuration module causes the second communication interface to receive the communication parameters, and then configures the first communication interface using the communication parameters such that the device can be connected to the wireless network.

2. The system of claim 1, wherein the second communication interface establishes a secure communication link with the communication parameter source to receive the communication parameters.

3. The system of claim 1, wherein the second communication interface communicates with the communication parameter source wirelessly.

4. The system of claim 1, wherein the first and second communication interfaces and the interface configuration module reside inside the device while the communication parameter source is located outside the device.

5. The system of claim 1, wherein the communication parameter source is a beacon that broadcasts the communication parameters.

6. The system of claim 1, wherein the communication parameter source is a communication parameter server also connected with the wireless network.

7. The system of claim 1, wherein the first and second communication interfaces employ different wireless communication technologies.

8. The system of claim 1, wherein the interface configuration module detects when the first communication interface needs to be configured with the communication parameters.

9. A method of automatically configuring a communication interface of a device for connection with an external wireless network, comprising:

(A) providing a second communication interface inside the device;

(B) causing the second communication interface to communicate with an external communication parameter source for the communication parameters, wherein the communication parameter source stores the communication parameters of the wireless network;

(C) configuring the first communication interface with the communication parameters received such that the device can be automatically connected to the wireless network.

10. The method of claim 9, wherein the step (B) further comprises the step of broadcasting from the second communication interface a request for the communication parameters wirelessly.

11. The method of claim 9, wherein the step (B) further comprises the steps of automatically discovering the communication parameter source; and connecting to the communication parameter source wirelessly.

12. The method of claim 11, wherein the second communication interface is an infrared communication interface that can automatically discover communication partners within range.

13. The method of claim 11, wherein the second communication interface is a short range radio communication interface that can automatically discover communication partners within range.

14. The method of claim 9, wherein the communication parameter source is a beacon that broadcasts the communication parameters.

15. The method of claim 9, wherein the first and second communication interfaces employ different wireless communication technologies.

16. The method of claim 9, the step (B) further comprises the step of establishing a secure communication link before the second communication interface receives the communication parameters from the source.

* * * * *

UNITED STATES PATENT AND TRADEMARK OFFICE
CERTIFICATE OF CORRECTION

PATENT NO. : 6,975,857 B2  Page 1 of 2
APPLICATION NO. : 09/891705
DATED : December 13, 2005
INVENTOR(S) : Jean Tourrilhes et al.

It is certified that error appears in the above-identified patent and that said Letters Patent is hereby corrected as shown below:

Title Page, Item (56), under "U.S. PATENT DOCUMENTS", in column 2, below "6,721,555 Bl *  4/2004 Phillips et al. .........455/411" insert -- 6,603,744  08/2003  Mizutani et al.
    6,580,909  08/2003  Carro
    6,697,649  02/2004  Bennett et al.
    6,797,519  09/2004  Cohen et al.
    6,230,016  05/2001  Kinnunen et al.
    6,178,323  01/2001  Nagata --.

In the Drawings, delete sheet 4 of 4, and replace with drawing sheet 4. (Attached)

Signed and Sealed this

Ninth Day of February, 2010

David J. Kappos
*Director of the United States Patent and Trademark Office*

Figure 4